H. C. PIERLE.
CHANGE OF SPEED MECHANISM.
APPLICATION FILED JULY 14, 1919.

1,374,109.

Patented Apr. 5, 1921.
2 SHEETS—SHEET 1.

Inventor:
Henry C. Pierle
By Allen & Allen
Attorneys.

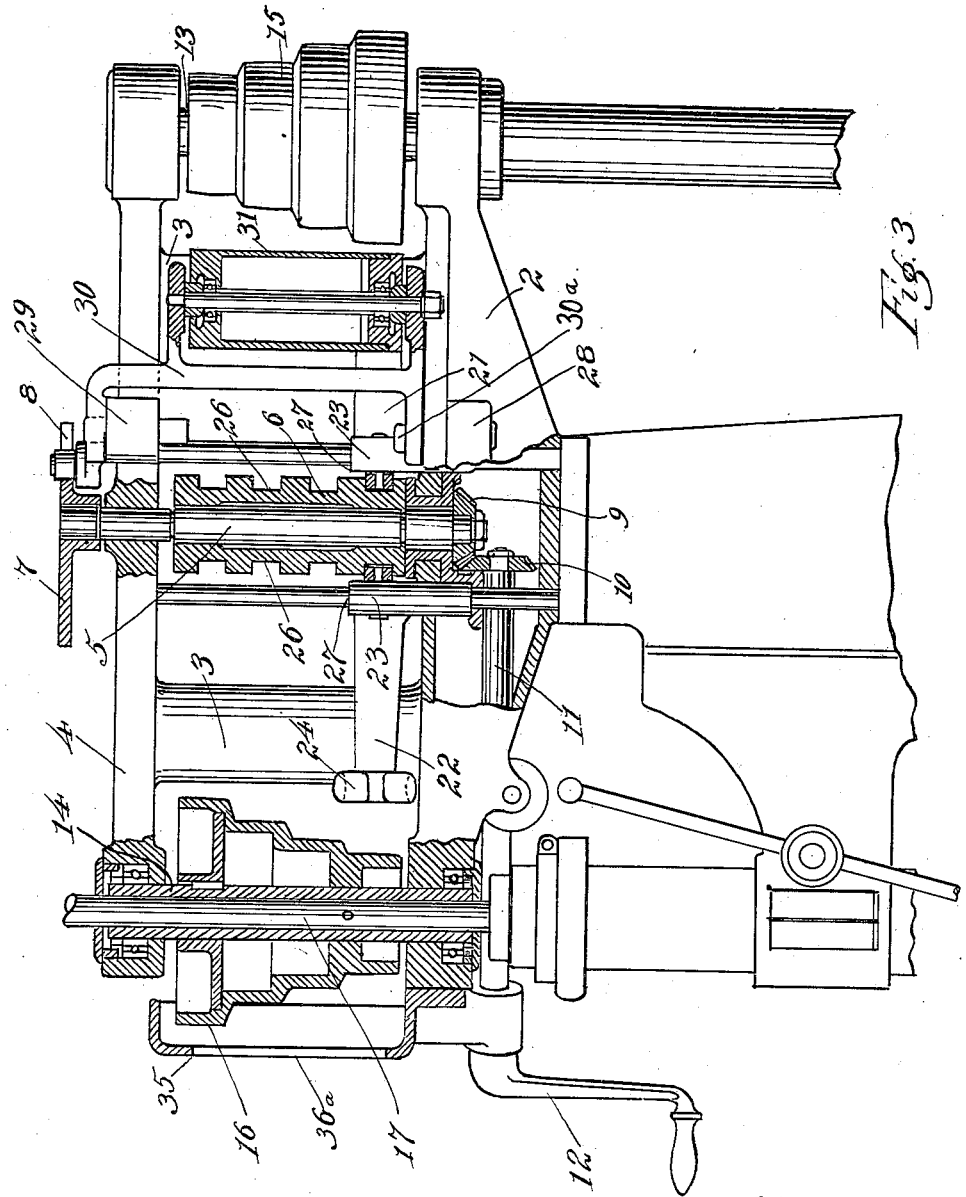

UNITED STATES PATENT OFFICE.

HENRY C. PIERLE, OF CINCINNATI, OHIO, ASSIGNOR, BY MESNE ASSIGNMENTS, TO THE R. K. LE BLOND MACHINE TOOL COMPANY, OF CINCINNATI, OHIO, A CORPORATION OF OHIO.

CHANGE-OF-SPEED MECHANISM.

1,374,109.   Specification of Letters Patent.   Patented Apr. 5, 1921.

Application filed July 14, 1919. Serial No. 310,638.

*To all whom it may concern:*

Be it known that I, HENRY C. PIERLE, a citizen of the United States, and a resident of Cincinnati, in the county of Hamilton and State of Ohio, have invented certain new and useful Improvements in Change-of-Speed Mechanism, of which the following is a full, clear, and exact description, reference being had to the accompanying drawings, forming part of this specification.

My invention relates to mechanism for use particularly in connection with drill presses, but also in other connections for changing speeds, and involves among other things the use of cone pulleys and a belt shifter.

It is the object of my invention to provide a change of speed mechanism which can be used in various mechanisms, but which is particularly adapted for use in drill presses wherein the drilling spindle is carried on the shaft of one of the cone pulleys, and both driving and spindle pulleys are mounted on vertical axes. It is an object to make this change of speed mechanism shift on one pulley prior to shifting on the other, and combine this with a belt tightener which is thrown out of operation automatically by the initial motion in shifting the belt.

So far as the use of my speeder as a head for the pillar of a drill press is concerned, and generally from the point of view of providing a high speed mechanism, it is my object to balance the necessary parts of the device so that greatest smoothness in operation will be attainable. In connection with my belt guard near the operating handle, it is my object to give an indication of the speed which is attained by the shifting of the belt.

These objects and other advantages to be noted I accomplish by that certain construction and arrangement of parts to be hereinafter more specifically pointed out and claimed.

In the drawings,

Fig. 3 is a side elevation thereof, with the large proportion of the device being shown in central vertical section.

Figure 1:
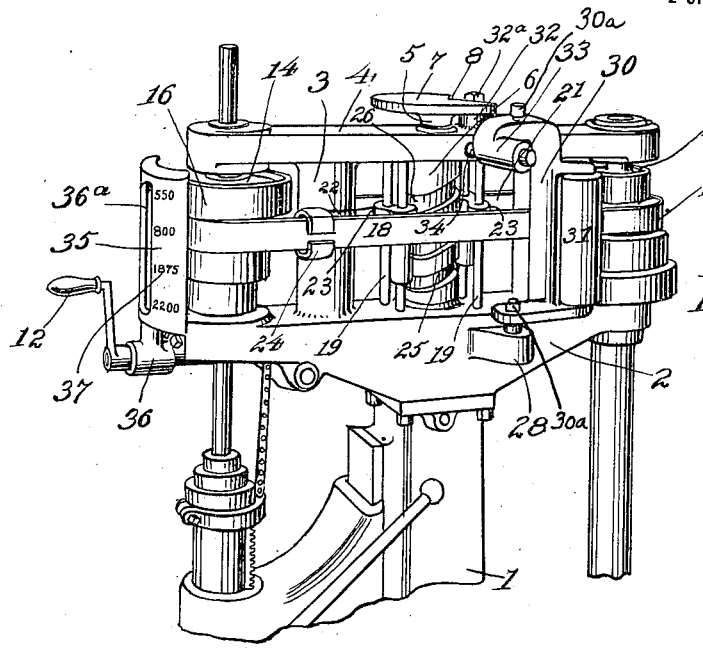
Figure 1 is a perspective view of the device.
Figure 2:
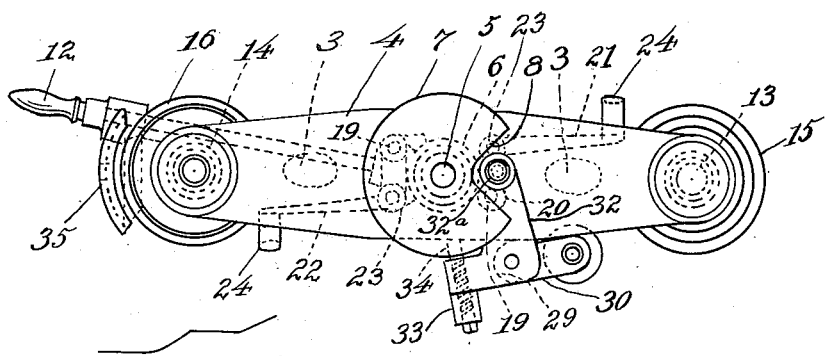
Fig. 2 is a top plan view thereof.
Figure 4:
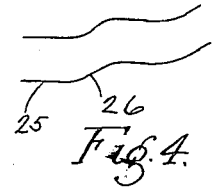
Fig. 4 is a development of the face of the cam cylinder.

On the pillar 1 of the drill press or other mechanism which is to be the machine operated by my device, is mounted the bed plate 2, from which extend upwardly two oval-shaped standards or spacers 3, that have at their upper end the top plate 4. Care is taken that the two spacers or standards be situated so as to balance each other, and journaled centrally between the two standards and centrally of the bed plate and top plate is a shaft 5, which carries, between the two plates, a cylindrical grooved cam 6 which operates the belt shifters. The shaft also extends above the top plate where it is provided with a disk 7 having a notch 8, the disk and notch being employed for controlling the belt tightener.

Within the center of the bed plate, the shaft 5 is provided with a beveled gear 9, which meshes with a beveled gear 10, mounted on the operating shaft 11. This latter shaft extends out to the side of the bed plate where it is equipped with a handle 12.

Mounted between the outer edges of the two plates of the speeder, and preferably provided with ball bearings both above and below, are the two vertical shafts 13 and 14. On the shaft 13, which is the driving shaft of the device, is the cone or stepped pulley 15, while on the shaft 14, within which is the driven or spindle shaft, is mounted the like pulley 16. Due to the use of the device for drilling purposes the pulley 16 should be slidable with relation to the spindle shaft, and hence the shaft 14 is hollow and the pulley is slidable thereon, while the spindle shaft 17 passes through said shaft 14, so as to be driven thereby. A belt 18 passes around the two reversely stepped cone pulleys 15 and 16.

There are two pairs of rods 19 and 20 respectively positioned each side of the cylindrical cam, and the two belt shifting arms 21 and 22 have double sleeves 23, which engage slidably over the rods. The arms 21 and 22 terminate in the belt engaging forks 24.

The cylindrical groove cam shaft has a specially shaped groove therein, which has the alternate horizontal and inclined quarter turns 25 and 26 respectively. The shifter arms have extended ends provided with anti-friction rollers 27 which ride in the groove on opposite sides of said cam.

The result of the structure so far described is that upon the operation of the shaft 11, the beveled gears above noted revolve the cylindrical cam, with the result of first causing one antifriction roller to ride up the incline and then the other, so that both have been elevated or depressed an equal amount, at the close of one complete revolution of the shaft 11.

Bosses 28 and 29 are provided on the bed and top plates respectively of the device, in which is journaled the yoke 30, carrying the idler roller 31. The yoke has an arm 32, which extends toward the center of the device, where it is equipped with a roller 32ª that rides on the surface of the controlling disk 7. The yoke 30 is preferably set on studs 30ª on the bosses or lugs 28, 29, and thus is removable for mounting the belt by merely lifting it from the studs.

The yoke has also a plunger arm 33, which carries a spring plunger 34, that abuts against the side of the top plate and tends to force the idler roller against the belt, as it passes between the two pulleys, thereby preserving it in a well tightened condition.

The normal or driving position of the disk 7 is with the notch 8 thereof located so as to permit the yoke to lie in a position as controlled by the spring plunger to tighten the belt. The inception of the belt shifting motion will, however, result in forcing the arm 32 away from the center of the device, and thus remove the roller 31 from tightening position. The reason for this is that the disk is connected to the same shaft as the cylindrical grooved cam that operates the belt shifter.

Adjacent the operating handle 12 on the shaft 11, which controls the belt shifter and tightener, I mount a belt guard 35 at the side of the bed plate, adjacent the pulley for the spindle shaft, and preferably journal the shaft 11 in the base of the guard as at 36. The guard is made with a central slot 36ª therein, which is not of sufficient width to expose the operator to the chance of touching or being struck or caught by the belt, but is of sufficient width to expose the belt to view. Space is left between the upper edge of the guard, which is free, and the pulley 16 to permit of mounting an endless belt.

With the position of the belt as an indicator, the guard is provided with marks 37 giving the speed in revolutions per minute, brought about by the position of the belt. The operator can readily tell the speed of his machine by a glance at the indications on the belt guard, thereby preventing him from chances of error in working with the incorrect belt position.

It is readily observable that the parts of the device are balanced, so that the least possible vibration from highspeed operation is brought about. The device is well adapted to the use with vertical spindles, as in the case of drill presses, and is easy of operation and durable and safe.

Having thus described my invention, what I claim as new and desire to secure by Letters Patent, is:

1. In a device of the character described, the combination with a pair of reverse cone pulleys, of a belt passing around said pulleys, a belt shifter for engaging and moving said belt over said pulleys, a resilient belt tightener adapted to bear on the belt to maintain tension thereof, and means in connection with the belt shifter for relieving the tightener from tensioning position, for the purpose described.

2. In a device of the character described, the combination with a pair of reverse cone pulleys and a belt therefor, of a belt shifter adapted to move said belt first on one pulley and then on the other, a belt tightener adapted to bear on said belt, and means in connection with the belt shifter for moving the tightener away from tightening position upon the inception of the motion of the shifter.

3. In a device of the character described, the combination with a pair of reverse cone pulleys and a belt therefor, of a belt shifter adapted to move the belt over said pulleys, a roller spring-pressed against said belt for tensioning the same, and means in connection with the belt shifter for swinging said roller away from tensioning position against the belt, during the operation of said shifter.

4. In a device of the character described, the combination with a pair of reverse cone pulleys and a belt therefor, of a belt shifter adapted to move the belt first over one pulley and then over the other, a roller spring-pressed against said belt for tensioning the same, and means in connection with the belt shifter for swinging the said roller out of tensioning position against the belt at the inception of the first movement of the said shifter, for the purpose described.

5. In a device of the character described, the combination with a pair of reverse cone pulleys and a belt therefor, of a belt shifter device, a cylindrical cam having alternate inclined engaging portions for moving first one side and then the other of the belt shifter, a tension roller having an arm thereon to throw it out of tension with the belt, and means on said cylindrical cam to operate said arm, whereby said arm is actuated at the inception of each complete movement of said cam.

6. In a device of the character described, the combination with a pair of belt shifters, and cam operated actuating means therefor, for shifting a belt over reversely stepped cone pulleys, of a tension roller for a belt pivoted to the device, and spring-pressed toward the belt, and a cam device for throwing said roller into and out of tension position connected to the cam operated means for actuating the belt shifters.

7. In a device for operating high speed tools, the combination with a pair of reversely stepped cone pulleys on vertical axes, of vertically disposed cam means, a pair of belt shifting appliances, one for each pulley operatively connected to the cam means, a tension roller pivoted to the device and adapted to bear normally against a belt connecting said two pulleys, and a device connected to said cam means for throwing the roller out of normal position upon the operation of said cam means.

8. In a device for operating high speed tools, the combination with a pair of reversely stepped cone pulleys on vertical axes, of vertically disposed cam means, a pair of belt shifting appliances, one for each pulley operatively connected to the cam means, a tension roller pivoted to the device, and adapted to bear normally against a belt connecting said two pulleys, and a device connected to said cam means for throwing the roller out of normal position upon the operation of said cam means, said device comprising a notched disk and an arm connected to the roller and bearing against the face of the disk, said notch being positioned to permit the roller to come to tensioning position at the completion of any shifting operation of the cam means.

9. In a device of the character described, the combination with reversely stepped cone pulleys, of a belt passing over said pulleys, and a guard adjacent one of said pulleys, for the belt, said guard having an opening to expose the belt and indications adjacent the opening whereby the speed of operation of the belt is shown by the indication adjacent its position.

10. In a high speed mechanism, the combination with a bed plate, of a central shaft therethrough carrying a cylindrical cam supporting posts alongside the said cam, and an upper plate upon said posts, a pair of reversely stepped cone pulleys mounted between said bed and upper plate, and having shafts extending therethrough and through the bed plate, of a pair of belt shifting arms, having engaging members for said cylindrical cam, whereby the complete turn thereof will shift the belt one step, an operating handle and shaft at the side of the bed plate connected to said cylindrical cam, and a shield for the belt adjacent said handle, having an opening therein for exposing the belt on one of the pulleys, and indicating marks adjacent said slot, whereby the speed attained may be read on the indications, by the position of the belt in said slot.

11. In a device of the character described, the combination with a pair of belt shifters, and cam operated actuating means therefor, for shifting a belt over reversely stepped cone pulleys, of a tension roller for a belt pivoted to the device, and spring-pressed toward the belt, and a cam device for throwing said roller into and out of tension position connected to the cam operated means for actuating the belt shifters, the pivot for the tension roller comprising a pin and socket, whereby the roller may be lifted away readily for mounting an endless belt on the pulleys.

12. In a device of the character described, the combination with reversely stepped cone pulleys, of a belt passing over said pulleys, and a guard adjacent one of said pulleys, for the belt, said guard having an opening to expose the belt and indications adjacent the opening whereby the speed of the belt is shown by the indication adjacent its position, said guard being mounted to the device so as to leave a space between its upper end and the pulley, whereby an endless belt may be placed over the said pulley.

HENRY C. PIERLE.